June 12, 1945.  W. H. BARLOW  2,378,122
FASTENING DEVICE
Filed July 31, 1941  2 Sheets-Sheet 2
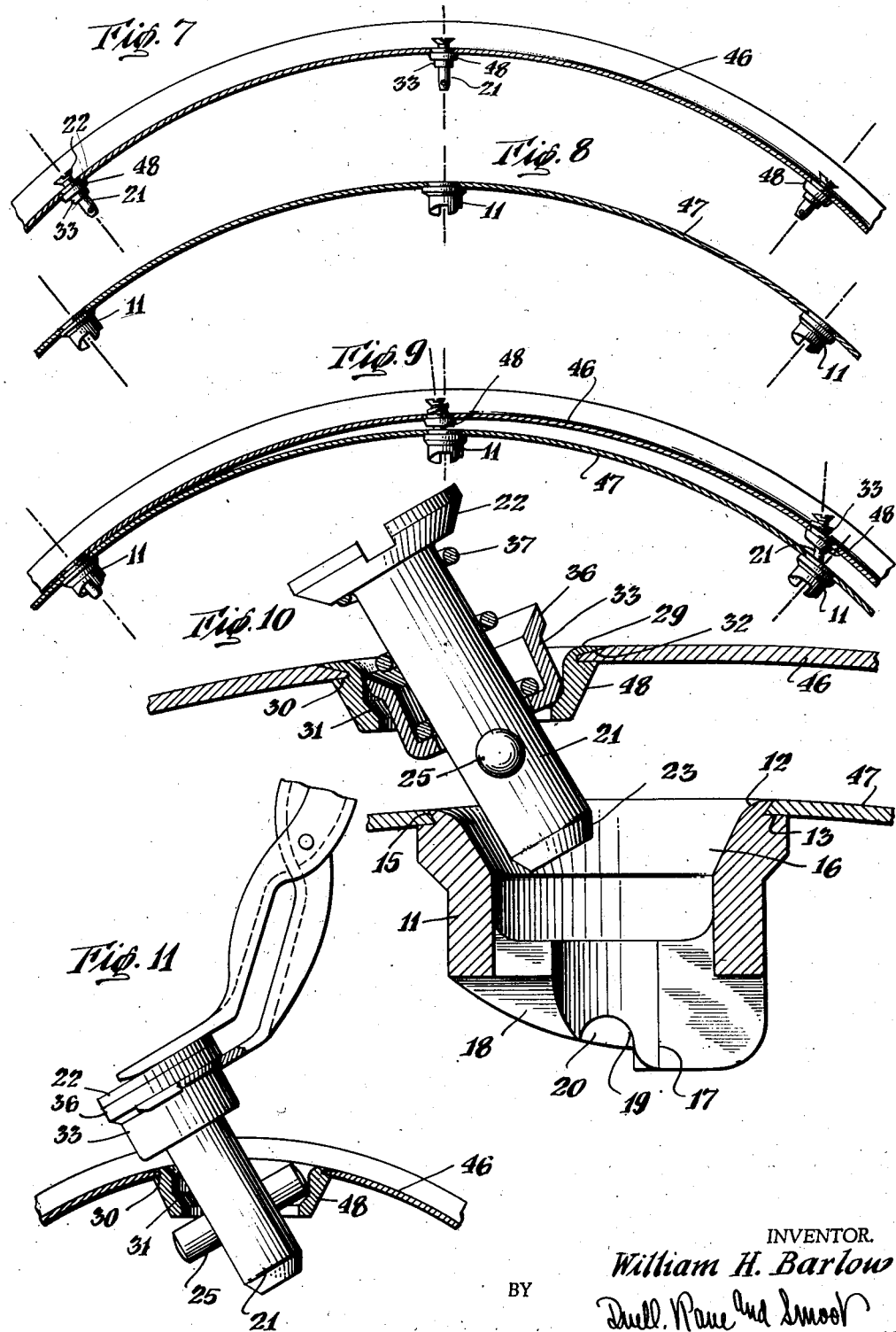
INVENTOR.
William H. Barlow
BY
ATTORNEYS Patented June 12, 1945

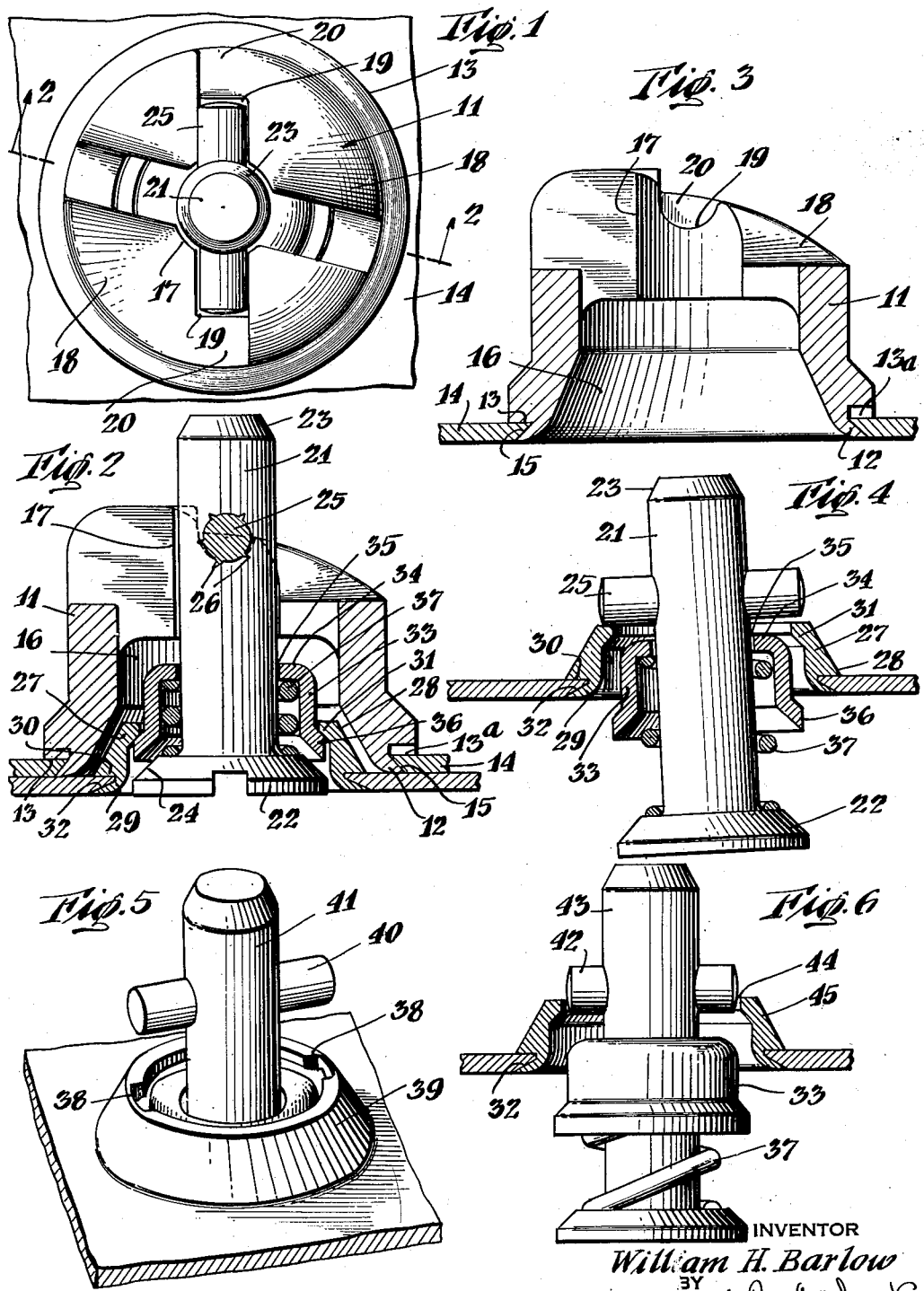

2,378,122

UNITED STATES PATENT OFFICE 2,378,122

FASTENING DEVICE

William H. Barlow, Waterbury, Conn., assignor, by mesne assignments, to Camloc Fastener Corporation, New York, N. Y., a corporation of New York Application July 31, 1941, Serial No. 404,769

11 Claims. (Cl. 24—221)

This invention relates to a new and improved fastening device, especially suited for use on airplanes and the like. It has been found desirable to extend the serviceable use of quick operating fasteners to many other areas of airplanes than that of cowling. The ready removal of surface sheets or portions thereof provides space for location of equipment, supplies, accessories or operating mechanisms which are subject to inspection, repairs, maintenance, replacement and the like, where otherwise such space would be completely unsuitable. For aerodynamic reasons, most of these access areas are curved, sometimes quite sharply, and may have rather extensive arcs. The ability to secure the surface sheets to these areas with a quick operating fastener, determines their availability for use as access areas.

An object of the invention is the provision of means for quickly securing and removing sheeted areas of sharply curved surfaces and the use of the space within for any required or desirable purpose.

Another object is that of providing a fastening means which may be utilized with various sheet thicknesses which are subject to substitution one for the other.

A further object is that of providing a fastener of this type which has considerable tolerance when in unassembled position and readily lends itself to thrust away from its longitudinal axis, but which when assembled, assumes rigidity and resists such shifting to a marked degree, thus, lending itself to installation and use on either concave or convex surfaces of relatively short radius.

A still further object is that of providing a fastener in which one of the members is completely separable from the sheet which normally carries the same and which can be threaded and unthreaded from said sheet by means, for example, of a special tool designed for that purpose.

With these and other objects in view, reference is had to the attached sheets of drawings illustrating different embodiments of the invention, and in which:

Fig. 1 is a plan view of a fastener embodying my invention, looking at the bottom of such fastener in assembled position;

Fig. 2 is a cross section of the assembled fastener shown in Fig. 1, taken along the lines 2—2 of Fig. 1 and looking in the direction of the arrows;

Fig. 3 is an elevation and cross section of the cam collar member of the fastener shown in Fig. 2;

Fig. 4 is a side elevation partially in cross section of the spring retainer and grommet of the stud assembly of the same fastener;

Fig. 5 is a perspective view of a slightly modified grommet and stud assembly embodying my invention;

Fig. 6 is a side elevation in partial cross section of another modified type of stud assembly embodying my invention;

Fig. 7 is a side elevation of a convex airplane fuselage surface on which are mounted several spring retainer stud assemblies;

Fig. 8 is a corresponding convex section of an airplane fuselage carrying the cam collars for cooperation with the spring retainer stud assemblies shown in Fig. 7;

Fig. 9 shows the plates of Figs. 7 and 8 in partially assembled position;

Fig. 10 is an enlarged detail in partial cross section of the right hand fastener assembly shown in Fig. 9; and Fig. 11 is an enlarged fragmentary view partially in cross section showing the threading of the spring retainer stud assembly through the grommet by means of a special tool.

In Figs. 1 through 4, and 7 through 11 there is shown a fastening device comprising a socket member preferably in the form of cam collar 11 having a flange or skirt 12 at its upper end; the latter being limited by a shoulder 13 extending outwardly from the cam collar body. The skirt 12 is adapted to be flared outwardly, for example, against the surface 14 of an airplane fuselage member so that the shoulder 13 abuts against the inner surface of said plate. In this connection, it will be noted that the plate is preferably drilled as at 15 with a counter-sunk or tapered aperture so that when the skirt 12 is flared outwardly, it will come to rest against the side walls of said aperture and thus be held against ready withdrawal. Likewise, the shoulder 13 has spaced serrations 13a on its surface which cause the shoulder to bite into the under surface of the sheet 14 and prevent turning of the cam collar. The cam collar is also provided with a large central opening 16 which is tapered inwardly and which in turn leads to a smaller opening 17 which extends through to the back of the collar. Opposed spiral trackway portions 18 are provided which progress upwardly along the back edge of the collar until a detent 19 is reached adjacent the top of said trackway portion. As has been shown in United States Patent No. 2,239,125, said detent is provided with end walls for purposes therein brought out.

Cooperating with the stud receptacle thus furnished is a stud 21 having, for example, a slotted manipulating head portion 22 and a tapered leading edge 23. The undersurface of the head 22 may also be tapered as shown in Fig. 4. The stud is provided in turn with means to engage the socket or cam collar, said means preferably being a transverse member, as for example a cross pin 25 associated adjacent the end opposite said head portion. The cross pin is preferably held in place by a friction-fit and has knurled or struck-out portions 26 around its circumference which key into the metal of the stud when the cross pin is squeezed or driven into position.

As will be seen from the drawings, said cross pin extends to either side of the stud and cooperates with the opposed spiral trackway portions 18 of the cam collar upon rotation of the stud, so that the cross pin advances along said track-way portion until it reaches the detents 19 where it is held in position. Cooperating with said stud is a grommet or collar member 27 preferably formed with an outer tapered wall 28 and a skirt or flange 29, the inner end of which is defined by the outwardly extending shoulder portion 30. In addition, an inwardly extending flange or shoulder portion 31 disposed at a substantially 45° angle is carried by the inner end of said grommet or collar member. This member is adapted to be secured, for example, to an inspection plate of an airplane or the like in the same manner as heretofore described in connection with the cam collar. In other words, the skirt or flange 29 is flanged outwardly against the previously drilled tapered opening 32 of said plate and thus held against displacement. Cooperating with the inner flange or shoulder 31 is a shiftable member embracing the stud and in one form comprising a spring retainer or cup member 33 which has a bottom 34 provided with an opening 35 through which the stud 21 passes. An outwardly depending flange 36 is carried by the opposite end of said cup member and in turn cooperates with the inner flange 31 of the grommet 27, preventing the passage of the cup member therethrough. A coiled spring 37 is positioned as shown between the base of the cup member 34 and the inner surface of the stud head 22. In this connection it will be noted that fasteners of this type are suitable for use with various sheet thicknesses and for that reason, the measurement from the cross pin 25 to the underside of the head 22 of the stud assembly should vary for different plate thicknesses if the most satisfactory fastener is to be realized, and to this end where such stud length is greater than standard, space washers may be inserted between the base of the cup member 34 and the spring 37 in order to keep the latter in the same degree of compression, as in the standard stud length.

As shown, for example, in Fig. 4, when the parts are in dis-assembled condition, the stud, spring and cup members are subject to substantial retraction with respect to the spring retainer and the retainer itself is subject to substantial retraction within the opening. In Fig. 11 there is illustrated the means of completely removing the so called spring assembly from the grommet by means of a special plier like tool. As will be noted, the flange 36 of the cup member 33 is grasped at its lower edge by the bottom jaw of the tool while the top jaw of the tool engages the stud head. Obviously, the bottom jaw of the tool is fork shaped to accommodate the cup member between its two prongs. A squeezing of the tool compresses the cup member and coil spring against the underside of the stud head allowing a sufficient distance between the under surface of the cup member bottom 34 and the cross pin 25 to permit a threading of the entire spring assembly through the grommet, as has been illustrated. In Fig. 5 a modification has been shown in which opposed slots 38 have been cut in the bottom flange of the grommet 39 so as to permit passage of the cross pin 40 carried by the stud 41 therethrough, thus permitting the stud to be completely withdrawn from the grommet, while in Fig. 6 the cross pin 42 of the stud 43 has been reduced in over-all length so as to permit passage through the opening 44 in the lower end of the grommet 45.

In Figs. 7 through 10 an illustration of the flexibility of fasteners embodying my invention has been schematically shown in order that the great utility thereof may be readily appreciated. In these views, an outer plate 46 and an inner plate 47 of, for example, the motor nacelle of an airplane are shown in their conventional concave form. A series of spaced stud assemblies 48 mounted in the upper plates are shown cooperating with cam collars 11 mounted in the lower plates. The alignment of the respective parts of the fastener on a curved surface such as here shown is such that if the parts shown in Figs. 7 and 8 were moved together to assume the position shown in Fig. 9 with the fastener parts in the left hand side of the views in alignment, the remaining fasteners are thrown completely out of alignment with their cooperating stud receptacles. In the conventional rigid type fastener assembly as has been shown, for example, in U. S. Patent No. 2,239,125 above referred to, tolerances are such that no provision is made for any lateral shifting of the parts during the assembly operation. However, as has been shown in detail in Fig. 10, fasteners embodying my present invention are so flexible in their handling that the stud assembly with the spring and cup member can be shifted back into the grommet to permit a pivoting of the stud assembly along its longitudinal axis until it assumes the position shown in Fig. 10 at which time it will penetrate the cam collar and permit plates 46 and 47 to be brought more closely together and thus assume the position where alignment of the parts, in fact, exists.

It is, of course, to be appreciated that in all of the foregoing description, while reference has been made to the especial adaptation of these fasteners to airplane use, that they are obviously suited for and can be used in many other types of work. Accordingly, this invention is not meant to be limited in any wise to specific use in connection with airplane parts. Likewise, it is also apparent that many changes and rearrangements of the respective parts of the stud assembly and cam collar might be resorted to without in the least departing from the spirit of this invention.

I claim:

1. A rotatable fastener stud assembly to be positioned in an opening of a carrying member and adapted for engagement in closed position with a cooperating fastening member, said assembly comprising an elongated stud adapted to be positioned in said opening, a head associated with one end of said stud and larger than said opening, a transverse engaging means associated with the opposite end of said stud for contact in closed position with said cooperating member and normally when in open position preventing removal of said stud through said opening without tilting; a cup member encircling said stud and provided with an outwardly extending flange having greater width than said opening, said cup adapted to engage in said opening to normally prevent such tilting and said flange adapted to engage with the carrying member adjacent the periphery of said opening and to limit the movement of said cup in one direction, and resilient means cooperating with said stud to retain said cup in normal position, thus preventing removal and to permit shifting thereof when desired whereby said device may be tilted and said cup and engaging means passed through said opening in the other direction.

2. A fastening device including in combination a grommet formed with a central opening and adapted to be secured to a layer of material, retainer engaging means carried by said grommet, a retainer member also having a central opening and projecting downwardly through said grommet opening, cooperative engaging means carried on said retainer for engaging contact with said grommet means to limit the downward projection of said retainer member, a stud positioned within said retainer opening and rotatable therein, a cross pin carried by said stud below the point where the latter projects through said retainer member, said cross pin having an overall length greater than the diameter of said grommet opening and greater than the diameter of said cup member opening whereby said cup member and stud may be retracted into said opening but will normally not fall therefrom.

3. A fastening device adapted to cooperate with a socket member including in combination a grommet formed with a central opening, adapted to be secured to a layer of material, retainer engaging means carried by said grommet, a retainer member also having a central opening and projecting downwardly through said grommet opening, cooperative engaging means carried on said retainer member for engaging contact with said grommet means to limit the downward projection of said retainer member, a stud positioned within said cup opening and rotatable therein, a cross pin carried by said stud below the point where the latter projects through said retainer member, and adapted to cooperate with said socket, said cross pin having an overall length greater than the diameter of said grommet opening and greater than the diameter of said retainer member opening whereby said retainer and stud may be retracted through said opening but will normally not fall therefrom.

4. A fastening device including in combination a grommet formed with a central opening and adapted to be secured to a layer of material, an inwardly depending flange carried by said grommet, a cup member provided with a central opening and adapted to be positioned in and projecting downwardly through said grommet opening, an outwardly depending flange carried by said cup member and adapted to engage said grommet flange to limit the downward projection of said cup member, a stud located within said cup opening, a cross pin carried by said stud below the point where the latter projects through said cup member, said cross pin being of an overall length greater than each of the diameters of said grommet opening and said cup member opening, resilient means cooperating with said stud and normally holding said cup in position within said grommet opening to prevent tilting of said stud sufficient to permit withdrawal of said cross pin through said grommet and means whereby said cup member may be shifted against said resilient means to permit tilting of said stud sufficient to permit withdrawal of said cross pin through said grommet opening.

5. In combination, mounting means having an aperture therein, a stud movably confined within the aperture, said stud having adjacent one end lateral extending portions the total length of which is slightly greater than the diameter of the aperture, stud embracing means less in diameter than the aperture and normally engaged therein, urging means operatively engaging said embracing means and a portion of the stud and normally maintaining said embracing means engaged in said aperture to prevent substantial tilting of said stud and whereby when said embracing means is moved relative to said stud against the action of said urging means the stud may be substantially tilted permitting passage of said lateral portions through said aperture.

6. In combination, mounting means having an aperture therein, a stud movably confined within the aperture, said stud having adjacent one end lateral extending portions the total length of which is slightly greater than the diameter of the aperture, stud embracing means formed to normally contact the mounting means adjacent the aperture and to prevent substantial tilting of said stud, urging means operatively engaging said embracing means and a portion of the stud and normally maintaining said embracing means in contact with said mounting means to prevent substantial tilting of said stud and whereby when said embracing means is moved from said aperture against the action of said urging means the stud may be substantially tilted permitting passage of said lateral portions through said aperture.

7. A stud assembly for removable application to a mounting member having an aperture therein comprising a stud to be movably confined within the aperture said stud having adjacent one end lateral extending portions the total length of which is slightly greater than said aperture diameter, stud embracing means less in diameter than the aperture and normally to be engaged therein, urging means operatively engaging said embracing means and a portion of said stud and normally maintaining said embracing means engaged in said aperture to prevent substantial tilting of said stud and whereby when said embracing means is moved from said aperture against the action of said urging means the stud may be substantially tilted permitting passage of said lateral portions through said aperture.

8. A stud assembly for removable application to a mounting member having an aperture therein comprising a stud, said stud having adjacent one end lateral extending portions, and a head adjacent the other, a stud embracing means less in diameter than the length of said lateral extending portions, urging means operatively engaging said embracing means and a portion of said stud, and normally maintaining said embracing means at a spaced distance from said head, whereby said embracing means may be moved against the action of said urging means towards said head and upon such moving said lateral extending portions may be passed through said aperture.

9. A stud assembly for removable application to a mounting member having an aperture therein comprising, a stud to be positioned movably within said aperture, said stud provided adjacent one end with a head larger than said opening and adjacent the other end with lateral extending portions the total length of which is slightly greater than the aperture diameter, stud embracing means less in diameter than said aperture normally engaged therein and movably positioned on said stud between said head and lateral portions, urging means operatively engaging said embracing means and a portion of said stud and normally maintaining said embracing means engaged in said aperture to prevent substantial tilting of said stud and whereby when said embracing means is moved relative to said stud head the stud may be substantially tilted permitting passage of said lateral portions through said aperture.

10. A stud assembly for removable application to a mounting member having an aperture therein comprising, a stud to be positioned movably within said aperture, said stud provided adjacent one end with a head larger than said opening and adjacent the other end with lateral extending portions the total length of which is slightly greater than the aperture diameter, stud embracing means less in diameter than said aperture, normally engaged therein and movably positioned on said stud between said head and lateral portions, means for engaging said mounting member extending from said embracing means and limiting movement in the direction of the lateral extending portions, urging means operatively engaging said embracing means and a portion of said stud and normally maintaining said embracing means engaged in said aperture to prevent substantial tilting of said stud and whereby when said embracing means is moved from said aperture toward the stud head the stud may be substantially tilted permitting passage of said lateral portions through said aperture.

11. A stud assembly for removable application to a mounting member having an aperture therein comprising, a stud to be positioned movably within said aperture, said stud provided adjacent one end with a head larger than said opening and adjacent the other end with lateral extending portions the total length of which is slightly greater than the aperture diameter, stud embracing means less in diameter than said aperture, normally engaged therein and movably positioned on said stud between said head and lateral portions, spring means on said stud and positioned between said stud head and embracing means and in normal uncompressed condition capable of limited movement thereon whereby said embracing means may be normally retracted into said aperture towards said stud head but remains sufficiently therewithin to prevent substantial tilting and whereby when said embracing means is compressed against said spring toward said head the stud may be substantially tilted to permit passage of said lateral portions through said aperture.

WILLIAM H. BARLOW.